United States Patent [19]

Ranheim, Jr.

[11] 4,012,084
[45] Mar. 15, 1977

[54] SELF-ALIGNING LOAD TRANSMISSION POST

[75] Inventor: Donald H. Ranheim, Jr., East Hartford, Conn.

[73] Assignee: Raymond Engineering Inc., Middletown, Conn.

[22] Filed: Jan. 28, 1975

[21] Appl. No.: 544,860

[52] U.S. Cl. .............................. 308/2 R; 73/139; 214/19; 267/122

[51] Int. Cl.² .................. F16C 7/00; F16C 9/00; F16C 11/00

[58] Field of Search ............ 73/139; 248/2, 13, 19, 248/26; 308/1 R, 237, 244, DIG. 3, DIG. 4, 2 R; 267/122

[56] References Cited

UNITED STATES PATENTS 3,683,686  8/1972  Sergan .............................. 73/139

Primary Examiner—Joseph F. Peters
Assistant Examiner—Richard A. Bertsch

[57] ABSTRACT

A self-aligning post is presented to direct and/or balance a load being transmitted. The post has a semispherical end section split from the remaining main cylindrical portion of the post whereby misalignment of the main cylindrical portion is compensated by the split end section.

6 Claims, 5 Drawing Figures

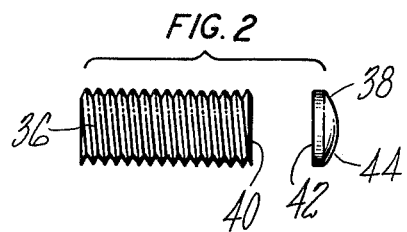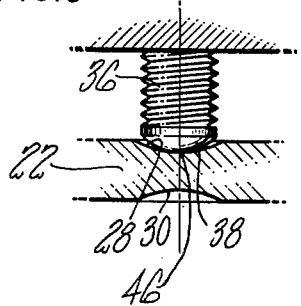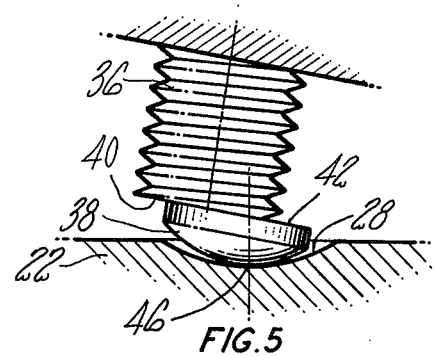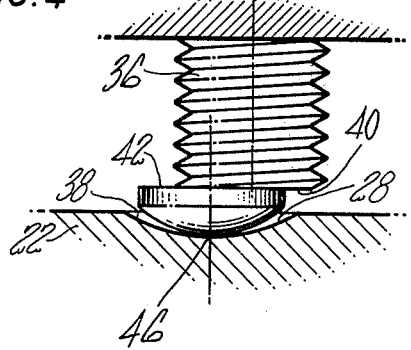

SELF-ALIGNING LOAD TRANSMISSION POST

BACKGROUND OF THE INVENTION

This invention relates to the field of load transmission devices. More particularly, this invention relates to a self-aligning load transmission post for use with a plurality of bellows or other devices in an environment where there are critical requirements for the direction and location in which a load is imposed.

Although not limited thereto in its utility, this invention is particularly intended to be an improvement in the construction of the mechanical torque wrench with hydraulic readout described in U.S. Pat. No. 3,683,686 assigned to the assignee of the present invention. Reference is hereby made to U.S. Pat. No. 3,683,686 for incorporation herein for a full understanding of the environment and details thereof in which the preferred embodiment of this invention will be described.

The torque wrench of U.S. Pat. No. 3,683,686 has a hydraulic readout system to obtain measurements of the torque being applied. That hydraulic readout system employs two hydraulic load cells, in the form of bellows, and a Bourdon gauge interconnected by hydraulic tubing, those elements being hermetically sealed and filled with a non-compressible fluid. As torque is applied with the wrench, reaction forces equal to output torque of the wrench are imposed on the bellows and measured on the Bourdon gauge to provide an accurate measurement of the torque output of the wrench.

Each bellows is mounted between a pair of opposed posts, and the reaction forces are applied to the bellows through these posts. Equalization of the loads on the bellows is critical for accurate readout of the torque load; and experience has shown that very close tolerances must be maintained on the alignment of the posts with each other and with the center line of the bellows to achieve this load equalization and accuracy in readout. While these tolerances can be realized, they increase the time and cost of manufacturing the wrench; and it has become highly desirable to find other ways of obtaining the desired load equalization.

SUMMARY OF THE INVENTION

In the present invention self-aligning posts are presented which insure that the reaction loads will always be delivered through the center of the bellows and along the axis of the bellows. This assures equalization of the load on each of the bellows and accuracy of readout, notwithstanding gross misalignment between the center line of the posts with each other or with the axis of the bellows. The self-aligning posts of the present invention are achieved by forming each of the posts in two separate parts. One part is a solid semispherical tip which engages a corresponding concave depression of larger radius in the bellows; and the other part is a main cylindrical section which has a flat end to engage and bear against the flat portions of the semispherical tip. The bellows is retained between opposed self-aligning posts. This split configuration of the posts assures that the reaction forces of the wrench are delivered through the center of the bellows and along the bellows axis regardless of misalignment between the posts with each other or with the axis of the bellows.

Accordingly, one object of the present invention is to provide a novel and improved self-aligning post.

Another object of the present invention is to provide a novel and improved self-aligning post for delivering balanced loads to a unit.

Still another object of the present invention is to provide a novel and improved self-aligning post for supporting a unit and delivering balanced loads thereto without critical tolerance requirements.

Other objects and advantages of the present invention will be apparent to and understood by those skilled in the art from the following detailed description and drawings.

BRIEF DESCRIPTION OF THE DRAWINGS

Referring to the drawings wherein like elements are numbered alike in the several figures:

FIG. 2 is a detailed view of the self-aligning post of the present invention.

FIG. 3 is a view showing the self-aligning post of the present invention in an aligned state with respect to the bellows.

FIGS. 4 and 5 are views showing the self-aligning post of the present invention misaligned with respect to the bellows.

DESCRIPTION OF THE PREFERRED EMBODIMENT

Figure 1:
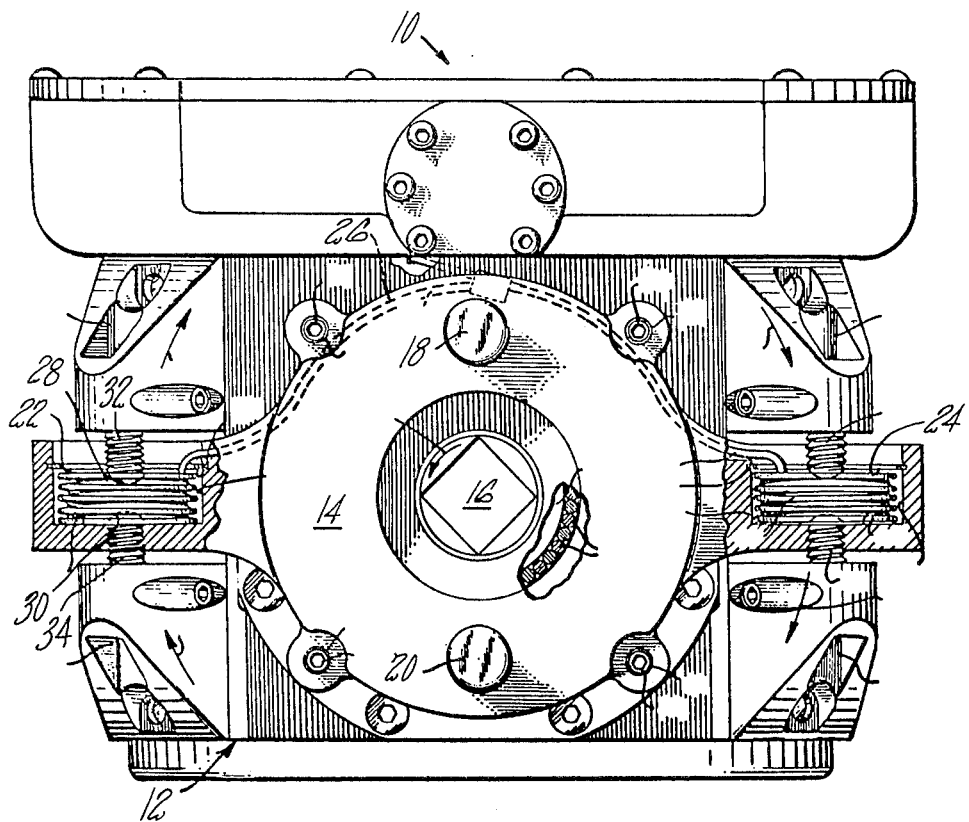
FIG. 1 is a partial sectional view of a torque wrench showing the environment for the preferred embodiment of the self-aligning post of the present invention.

FIG. 1 corresponds to FIG. 7 of U.S. Pat. No. 3,683,686, reference being hereby made to that patent for incorporation herein of the details set forth therein of the torque wrench disclosed therein. That torque wrench defines the environment in which the present invention is described and a brief description of the structures of FIG. 1 will be made to set forth that environment. Reference may, of course, be had to U.S. Pat. No. 3,683,686 for all of the details of construction and operation of that torque wrench.

Referring to FIG. 1, wrench 10 has a case 12 and a mounting collar 14 mounted on but relatively movable with respect to case 12. The output torque is provided at square socket 16. Pins 18 and 20 on mounting collar 14 serve to engage appropriate receiving holes on the item to be torqued or adapters to stabilize or ground mounting collar 14 so that there is relative movement between case 12 and mounting collar 14 when torque is delivered to an item to be torqued. Case 12 is thus responsive to a reaction torque equal and opposite to the torque delivered by the wrench.

A torque measuring system includes a pair of bellows 22 and 24, a Bourdon gauge (not seen in FIG. 1), and hydraulic tubing 26 which interconnects both of the bellows and the Bourdon gauge. The elements of the torque measuring system are filled with an incompressible fluid and are hermetically sealed. Each bellows has an upper concave depression 28 and a lower concave depression 30, the depressions being spherical segments and having their centers aligned coaxially with the axis of the bellows is held between a pair of opposed posts 32 and 34 which are seated at one end in the concave depressions and are adjustably secured at their other ends to wrench case 12, the posts being adjusted to achieve a free floating suspension of the bellows. As more fully set forth in U.S. Pat. No. 3,683,686, the measuring system is an independent torque measuring system capable of balancing forces throughout the system, measuring torque in either clockwise or counterclockwise direction, and accurately responding to the forces to which it is subjected.

Experience has shown that very close tolerances must be maintained on the alignment of the center line or axis of the opposed posts 32 and 34 with respect to each other and with respect to the center line or axis of the bellows to achieve the desired load equalizaton or force balancing and the desired accuracy in torque measurement. The tolerance which must be maintained is ± 0.002 inches between the center line of posts 32 and 34 and between those center lines and the axis of the bellows. If those tolerances are exceeded, the bellows may ground against its casing, and inaccurate readings may result. It should be understood that the desired tolerances can be maintained, but they increase the time, complexity and cost of manufacturing the wrench.

Referring to FIG. 2 the self-aligning post of the present invention is shown. This post, which replaces the posts 32 and 34 has a main cylindrical body portion 36, externally threaded to engage housing 12, and separate tip 38 which is a solid semispherical shape or other segment of a sphere. Body portion 36 has a flat end 40 perpendicular to the axis of the body portion, and tip 38 has a flat surface 42 perpendicular to its axis of rotation. An important feature is that the radius of curvature of the spherical shaped surface 44 of tip 38 is less than the radius of curvature of the associated depressions (e.g. 28 or 30) in the end of the bellows, the difference being on the order of 0.015 inches. This difference is very important to the proper functioning of this invention because it assures the load is always delivered to the bellows along the bellows center line. For purposes of illustration, the difference in dimensioning has been exaggerated in FIGS. 2–5.

FIG. 3 shows a situation where the axis of post 36 is aligned with the axis of a bellows, i.e. there is neither a lateral nor angular offset. This is the idealized situation. Tip 38 is centered in recess 28, with a single point of contact being made between tip 38 and bellows 22 at contact point 46 in the surface of recess 28 along the axis of the bellows. The reaction forces from the casing are delivered directly along the bellows axis through their single point of contact.

Referring to FIG. 4, a situation is shown where cylindrical body 36 (and its axis) is misaligned laterally with respect to the axis of bellows 22. The contact between the flat surfaces 40 and 42 remains flush where those surfaces overlap, and the axis of body 36 and tip 38 remains parallel, with the axis of tip 38 still being along the axis of bellows 22. Notwithstanding the offset between the axis of body 36 and tip 38, the force imposed through cylindrical body 36 is still delivered along the axis of bellows 22. This is so because there is still only a single point of contact 46 with the surface of recess 28 and the contact at that point is being made with a cylindrical surface whereby the force is in a radial direction in tip 38 at the point of contact.

Referring to FIG. 5, a configuration is shown where body 36 (and its axis) is misaligned both angularly and laterally with respect to the axis of bellows 22. The contact between flat surface 40 and 42 remains flush where they overlap, and thus the axis of revolution of tip 38 is also angularly offset with respect to the axis of the bellows. Notwithstanding the lateral and axial offset between the axes of body 36 and tip 38 with respect to the axis of bellows 22, the force imposed through cylindrical body 36 is still delivered along the axis of bellows 22. This is so because there is still only a single point of contact 46 with the surface of recess 28 and the contact at that point is being made with a cylindrical surface whereby the force is in a radial direction in tip 38 at the point of contact. It is to be noted that tip 38 has rotated with respect to recess 28 whereby a different point on the exterior of tip 38 is in contact with the single contact point. However, the force imposed on bellows 22 remains along the bellows axis because the single point 46 of contact between the spherical surface of tip 38 and the bellows is at the bellows center line and the force is in a radial direction at tip 38.

The same analysis and reason again applies for an offset between the axis of post 36 and the axis of bellows 22.

The foregoing discussion of FIGS. 3–5 has only referred to a single body 36 and tip 38 on one side of the bellows. That single post arrangement can, of course, be sufficient for any embodiment in which it is desired to deliver a load to only one side of bellows or other device. For the torque wrench configuration of FIG. 1 and U.S. Pat. No. 3,683,686, however, it will be understood that there will also be another post comprised of body 36 and tip 38 engaging the opposite recess 30. Recess 30 will also be of larger diameter than the tip which engages it, the size relationship being the same as that discussed above for tip 38 and recess 28, and all of the analysis presented above for lateral and/or angular offsets would also apply to this other side of the bellows.

From the foregoing, it can be seen that the present invention produces a self-aligning post where the load will always be delivered to a single point and along a desired direction with respect to a device to be loaded. In the environment of the torque wrench of FIG. 1, this assures balanced loading and free floating of the bellows even though there may be gross misalignment between the center line of the post bodies 36 with each other and/or with the center line of the bellows.

While preferred embodiments have been shown and described various modifications and substitutions may be made thereto without departing from the spirit and scope of the invention. Accordingly, the present invention has been described by way of illustration and not limitation.

What is claimed is:
1. A self-aligning post for transmitting a load to a bellows including:
 a cylindrical body portion having a planar end surface substantially perpendicular to the axis of said cylindrical body portion; and
 a semispherical tip, said tip having a flat surface perpendicular to the central axis of said tip and in contact with said planar surface of said cylindrical body portion, said tip also having a spherical shaped surface for engagement with a concave receptacle of the bellows, the radius of curvature of said spherical surface being less than the radius of the concave receptacle, whereby said spherical shaped surface of said tip is always in contact with the same part of the concave receptacle of the bellows when imposing a load, regardless of the alignment of said cylindrical body portion with respect to the bellows.
2. A self-aligning post as in claim 1 wherein:
 the central axis of said tip and the axis of said cylindrical portion are parallel at all times when transmitting a load.

3. A self-aligning post as in claim 1 wherein:
the bellows has an axis, and the load to the bellows is always transmitted to the bellows along the axis thereof.

4. A self-aligning post for transmitting a load to a device to be loaded, including:
a cylindrical body portion having a planar end surface substantially perpendicular to the axis of said cylindrical body portion; and
a semispherical tip, said tip having a flat surface perpendicular to the central axis of said tip and in contact with said planar surface of said cylindrical body portion, said tip also having a spherical shaped surface for engagement with a concave receptacle of the device to be loaded, the radius of the concave receptable, whereby said spherical shaped surface of said tip is always in contact with the same part of the concave receptacle of the device to be loaded when imposing a load, regardless of the alignment of said cylindrical body portion with respect to the device to be loaded.

5. A self-aligning post as in claim 4 wherein:
the central axis of said tip and the axis of said cylindrical portion are parallel at all times when transmitting a load.

6. A self-aligning post as in claim 4 wherein:
the load to the device to be loaded is always transmitted in one predetermined direction by said tip.

* * * * *

UNITED STATES PATENT AND TRADEMARK OFFICE
CERTIFICATE OF CORRECTION

PATENT NO. : 4,012,084
DATED : March 15, 1977
INVENTOR(S) : Donald H. Ranheim, Jr.

It is certified that error appears in the above-identified patent and that said Letters Patent are hereby corrected as shown below:

Column 2, line 60, after "bellows" insert -- . Each bellows--

Column 3, line 22, after "solid" insert --of--

Column 4, line 13, change "reason again" to --reasoning--

Column 6, line 2, (Claim 4, line 12) before "the" insert

--curvature of said spherical surface being less than the radius of--

Signed and Sealed this

Tenth Day of May 1977

[SEAL]

Attest:

RUTH C. MASON
Attesting Officer

C. MARSHALL DANN
Commissioner of Patents and Trademarks